United States Patent [19]
Hettinga

[11] Patent Number: 5,750,001
[45] Date of Patent: May 12, 1998

[54] METAL REINFORCED PLASTIC ARTICLE AND METHOD OF FORMING SAME

[76] Inventor: Siebolt Hettinga, 2123 NW. 111th St., Des Moines, Iowa 50325

[21] Appl. No.: 679,892

[22] Filed: Jul. 15, 1996

[51] Int. Cl.$^6$ .......................... B29C 31/00; B32B 31/20; B65C 9/25
[52] U.S. Cl. .................. 156/303.1; 156/309.6; 156/309.9; 156/322; 428/133; 428/137; 428/139; 428/140
[58] Field of Search ...................... 428/137, 140, 428/256, 134, 135, 139, 132, 133; 156/322, 303.1, 309.6, 309.9; 105/422

[56] References Cited

U.S. PATENT DOCUMENTS

| | | | |
|---|---|---|---|
| 1,505,272 | 8/1924 | Mart | 428/133 |
| 2,715,089 | 8/1955 | Michener et al. | 154/125 |
| 3,507,735 | 4/1970 | Chisholm | 156/380 |
| 3,582,449 | 6/1971 | Stolki et al. | 161/89 |
| 3,825,465 | 7/1974 | Stock | 161/112 |
| 4,260,576 | 4/1981 | Pollard | 264/257 |
| 4,788,088 | 11/1988 | Kohl | 428/34.5 |
| 5,093,208 | 3/1992 | Heyes et al. | 428/623 |
| 5,266,258 | 11/1993 | Martin | 264/249 |
| 5,364,682 | 11/1994 | Tanaka et al. | 428/138 |

*Primary Examiner*—Paul J. Thibodeau
*Assistant Examiner*—Holly C. Rickman
*Attorney, Agent, or Firm*—Brian J. Laurenzo; Kent A. Herink; Michael C. Gilchrist

[57] ABSTRACT

A metal reinforced plastic article is provided and comprises a first plastic member and a second plastic member bonded together through a plurality of apertures in a metal reinforcing member. Preferably, the metal reinforcing member has a plurality of angled protrusions on a first and second side. The protrusions on the first side are pressed into the first plastic member and the first plastic member is bonded to the protrusions, and the protrusions on the second side are pressed into the second plastic member and the second plastic member is bonded to the protrusions.

A method of forming a metal reinforced plastic article is provided and comprises providing a first plastic member and a second plastic member. A metal reinforcing member having a plurality of apertures therein, and having a plurality of angled protrusions on a first and second side is provided. The metal reinforcing member is heated and is placed between the plastic members, and the plastic members are pressed together resulting in the protrusions on the first side of the metal reinforcing member pressing into the first plastic member and the first plastic member bonding to the protrusions, and the protrusions on the second side of the metal reinforcing member pressing into the second plastic member and the second plastic member bonding to the protrusions. Additionally, the pressing of the plastic members together results in the plastic members bonding together through the apertures in the metal reinforcing member.

25 Claims, 5 Drawing Sheets

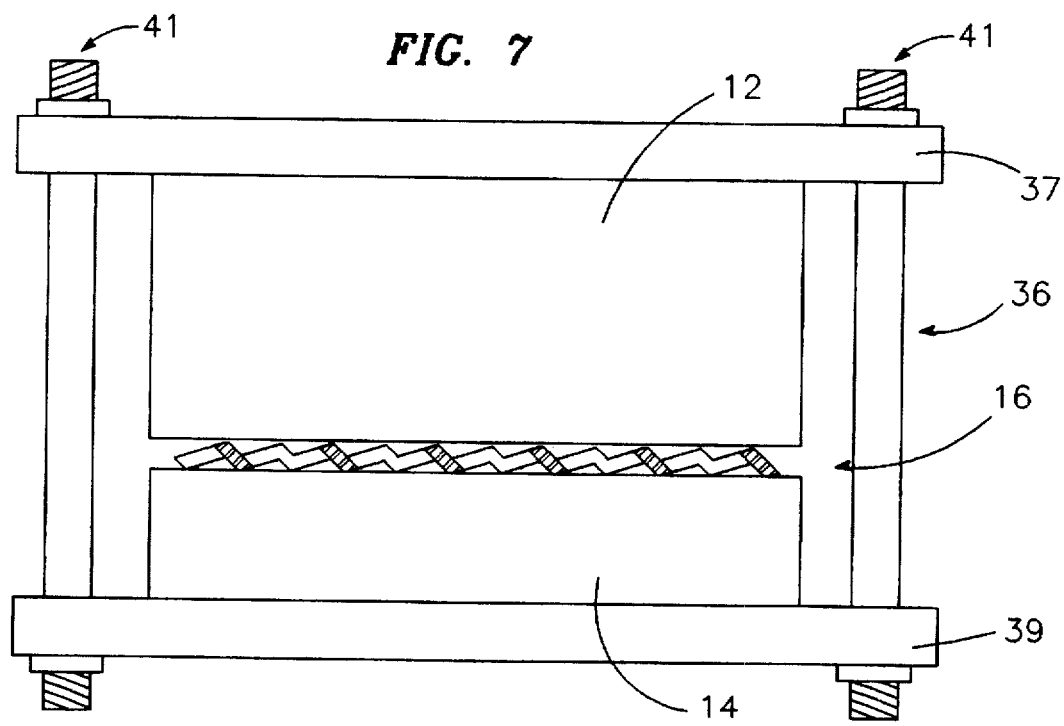
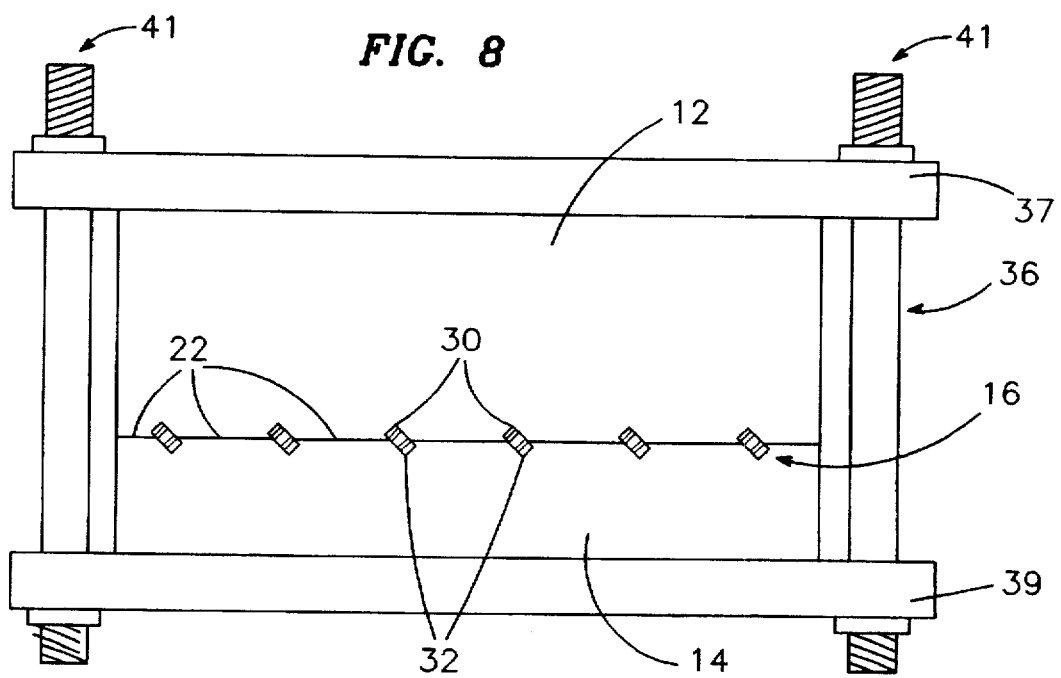

5,750,001

METAL REINFORCED PLASTIC ARTICLE AND METHOD OF FORMING SAME

BACKGROUND OF THE INVENTION

This invention relates to a metal reinforced plastic article and, more particularly, to a metal reinforced plastic article comprising a first plastic member and a second plastic member bonded together through at least one aperture in a metal reinforcing member. This invention also relates to a method of forming a metal reinforced plastic article and, more particularly, to a method of forming a metal reinforced plastic article where the method includes the steps of heating a metal reinforcing member, placing the metal reinforcing member between a first plastic member and a second plastic member, and pressing the plastic members together causing the first plastic member and the second plastic member to bond together through at least one aperture in the metal reinforcing member.

Presently, load bearing floors used in, for example, cargo containers, are made of wood or metal. Load bearing floors comprised of wood typically cannot sustain very heavy loads. Therefore, when a load bearing floor comprised of wood is used as the floor of a cargo container, the weight of the cargo loaded into the cargo container is naturally limited by the inability of the floor of the container to support a heavy load. While load bearing floors comprised of metal are typically stronger than load bearing floors comprised of wood, load bearing floors comprised of metal also suffer some disadvantages. For example, the metal of a load bearing floor is typically susceptible to either rusting or otherwise corroding as a result of the metal being generally exposed to moisture and other materials. Of course, the rusting or corroding of the metal in the load bearing floor generally results in the load bearing floor losing some of its ability to bear a heavy load. While load bearing floors comprised of metal may be over-designed in order to provide for a long life of supporting heavy loads notwithstanding the tendency for the metal to rust or corrode, over-designing a load bearing floor comprised of metal results in a load bearing floor which is typically heavier and which costs more money to produce.

The difficulties encountered in the prior art discussed hereinabove are substantially eliminated by the present invention.

SUMMARY OF THE INVENTION

It is an object of the present invention to provide a metal reinforced plastic article which is ideal when used as a cargo container floor because of its ability to, among other things, bear a heavy load.

Another object of the present invention is to provide a method of forming a metal reinforced plastic article where the metal reinforced plastic article can bear a heavy load.

Yet another object of the present invention is to provide a metal reinforced plastic article which is ideal when used as a cargo container floor because of its not being susceptible to rust or corrosion.

Still another object of the present invention is to provide a method of forming a metal reinforced plastic article where the metal reinforced plastic article is not susceptible to rust or corrosion.

Another object of the present invention is to provide a metal reinforced plastic article which is ideal when used as a cargo container floor because it is not only lightweight, but can sustain a long life of supporting heavy loads.

A further object of the present invention is to provide a method of forming a metal reinforced plastic article where the metal reinforced plastic article is both lightweight and can sustain a long life of supporting heavy loads.

Still a further object of the present invention is to provide a metal reinforced plastic article which is economical to provide.

Yet a further object of the present invention is to provide an economical method of forming a metal reinforced plastic article.

These and other objects of the invention will become apparent upon reference to the following specification, drawings, and claims.

By the present invention, it is proposed to overcome the difficulties encountered heretofore. To this end, a metal reinforced plastic article is provided and comprises a first plastic member and a second plastic member bonded together through at least one aperture in a metal reinforcing member. Also provided is a method of forming a metal reinforced plastic article. Specifically, the method includes the steps of heating a metal reinforcing member, placing the metal reinforcing member between a first plastic member and a second plastic member, and pressing the plastic members together thus causing the first plastic member and the second plastic member to bond together through at least one aperture in the metal reinforcing member.

In a preferred apparatus of the present invention, a metal reinforced plastic article is provided where the metal reinforced plastic article comprises a first plastic member having a thickness and a second plastic member having a thickness unequal to the thickness of the first plastic member. The first plastic member and the second plastic member are bonded together through a plurality of apertures in a metal reinforcing member comprised of expanded metal. Preferably, the metal reinforcing member has a first side and a second side, has a plurality of protrusions angled at about forty-five degrees on the first side, and has a plurality of protrusions angled at about forty-five degrees on the second side. The protrusions on the first side of the metal reinforcing member are preferably pressed into the first plastic member and the first plastic member is bonded to the protrusions, and the protrusions on the second side of the metal reinforcing member are preferably pressed into the second plastic member and the second plastic member is bonded to the protrusions.

In a preferred method of the present invention, a method of forming a metal reinforced plastic article is provided where the method comprises providing a first plastic member having a thickness, and providing a second plastic member having a thickness unequal to the thickness of the first plastic member. A metal reinforcing member of an expanded metal having a plurality of apertures therein is also provided where the metal reinforcing member is of an initial temperature. Preferably, the metal reinforcing member has a first side and a second side, has a plurality of protrusions angled at about forty-five degrees on the first side, and has a plurality of protrusions angled at about forty-five degrees on the second side. The metal reinforcing member is heated to a sufficient temperature and is placed between the first plastic member and the second plastic member, and the plastic members are pressed together by a compressing apparatus resulting in the protrusions on the first side of the metal reinforcing member pressing into the first plastic member and the first plastic member bonding to the protrusions, and the protrusions on the second side of the metal reinforcing member pressing into the second plastic member and the second plastic member bonding to the protrusions. Additionally, the pressing of the first plastic member and the second plastic member together results in the first plastic member and the second plastic member bonding together through the apertures in the metal reinforcing member.

BRIEF DESCRIPTION OF THE DRAWINGS

FIG. 4b is a perspective view of the metal reinforcing member of FIG. 4a;

FIG. 7 is an elevational view of the metal reinforcing member, the first plastic member and the second plastic member of FIG. 6 placed in a compressing apparatus; and FIG. 8 is a view of the compressing apparatus of FIG. 7 pressing the first plastic member and the second plastic member together showing the metal reinforced plastic article in cross-section.

DETAILED DESCRIPTION OF THE INVENTION

Figure 1:
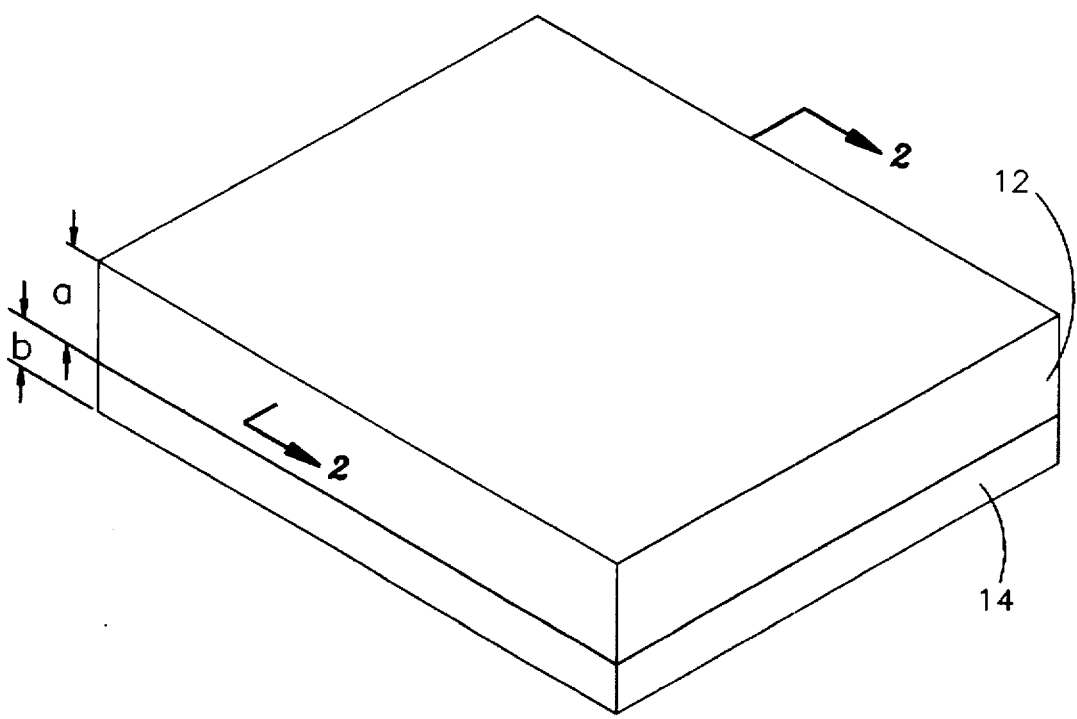
FIG. 1 is a perspective view of a metal reinforced plastic article in accordance with the present invention.
Figure 2:
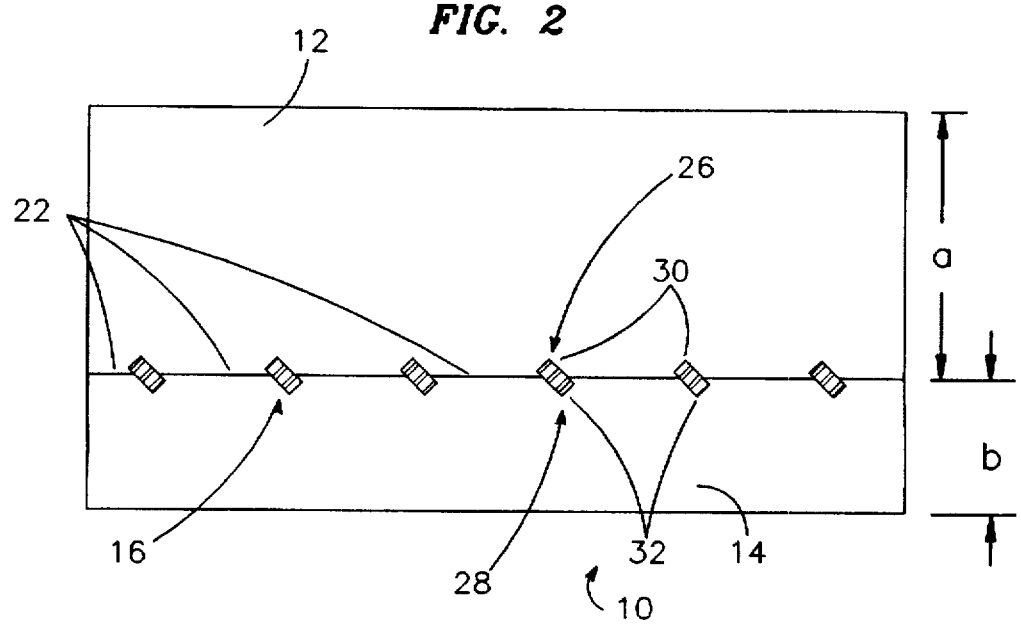
FIG. 2 is an elevation shown in cross-section along line 2—2 of the metal reinforced plastic article of FIG. 1 showing a first plastic member and a second plastic member bonded together through apertures in a metal reinforcing member.
Figure 3:
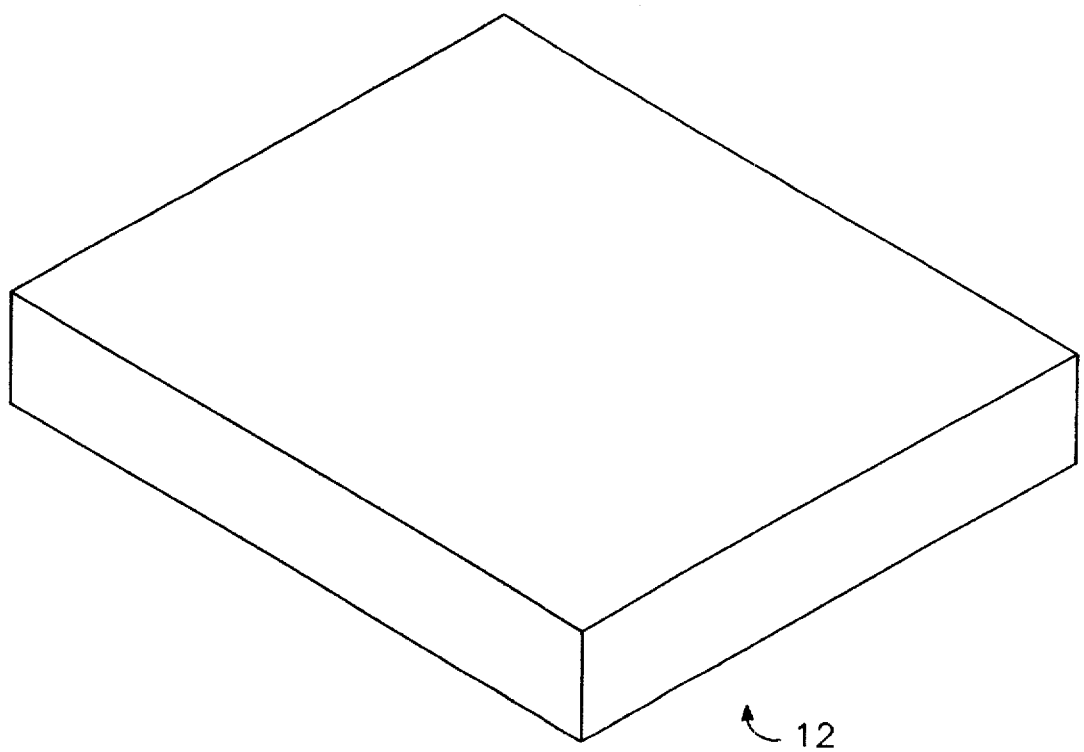
FIG. 3 is a perspective view of the first plastic member and the second plastic member of FIGS. 1 and 2.
Figure 3:
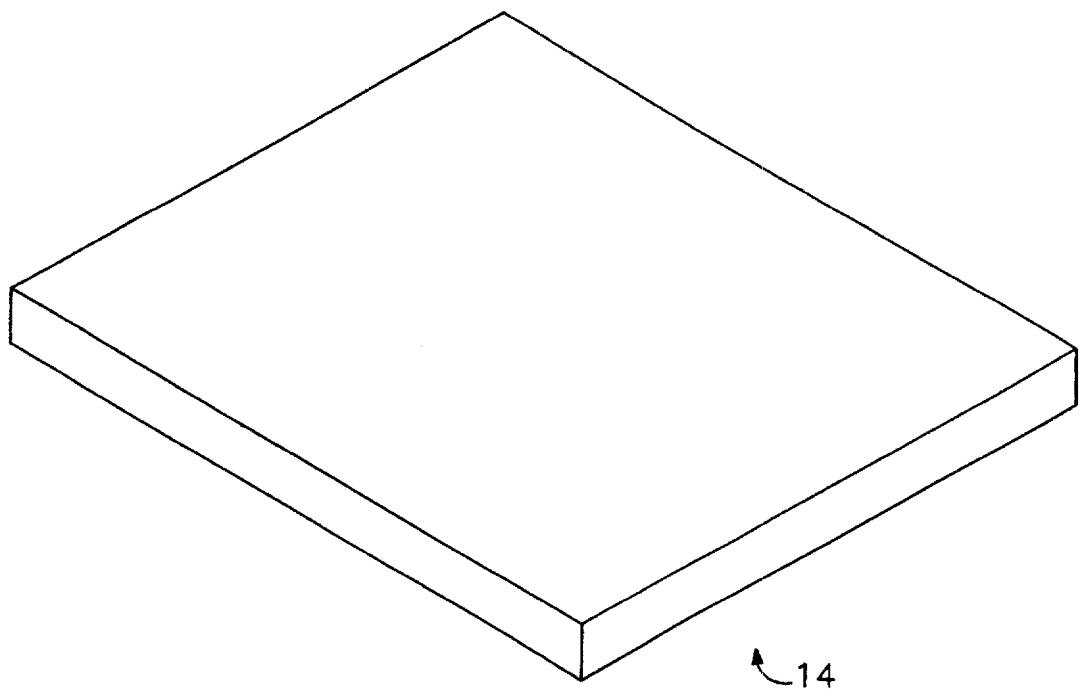

In FIGS. 1 and 2, there is shown a metal reinforced plastic article 10 comprising a first plastic member 12 of a thickness a and a second plastic member 14 of a thickness b. As shown, preferably the thicknesses a' and b' are not equal. However, the first plastic member 12 and the second plastic member 14 may be of any thickness, and, in fact, may have equal thicknesses. As shown in the cross-sectional view of FIG. 2, there is a metal reinforcing member 16 between the first plastic member 12 and the second plastic member 14. The first plastic member 12 and the second plastic member 14 are shown alone in FIG. 3, and may be made of ethylene or any other plastic material. As shown, preferably neither the first plastic member 12 nor the second plastic member 14 has any holes therethrough. The first plastic member 12 and the second plastic member 14 may have solid interiors, or it is possible to provide the first plastic member 12 and the second plastic member 14 with foamed interiors and densified outer skins. To provide the first plastic member 12 and the second plastic member 14 with foamed interiors and densified outer skins, it is possible to utilize the method for molding a plastic article of varied density as disclosed in U.S. Pat. No. 5,437,823, and the disclosure of this reference is hereby incorporated by reference.

Figure 4A:
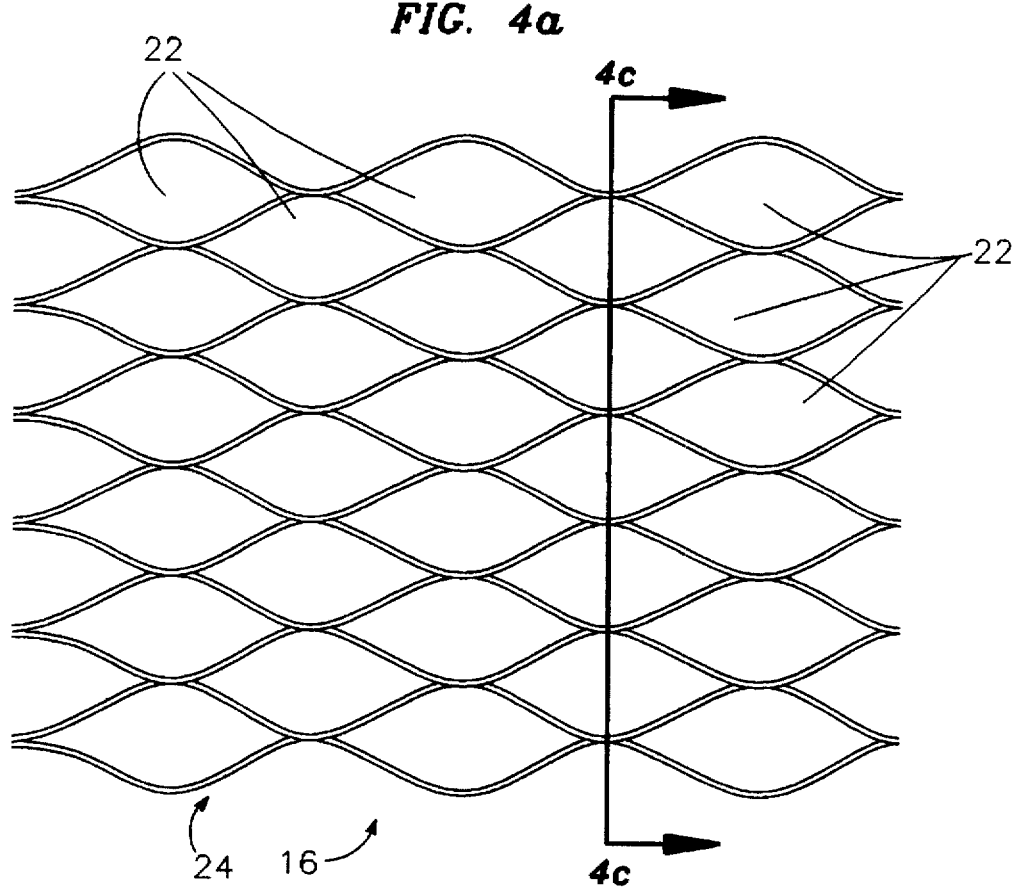
FIG. 4a is a top plan view of the metal reinforcing member of FIG. 2 shown alone and showing apertures in the metal reinforcing member.

As shown in FIG. 2, the first plastic member 12 and the second plastic member 14 are bonded together through a plurality of apertures 22 in the metal reinforcing member 16. The apertures 22 and the overall general shape of the metal reinforcing member 16 are more clearly shown in FIG. 4a. Preferably, the metal reinforcing member 16 is expanded metal 24 comprising Aluminum, Titanium, Magnesium or some other material which provides strength at a relatively light weight. Expanded metal 24 like that shown in FIG. 4a is well known in the art, and can be presently acquired from, for example, McNichols Company, P.O. Box 30300, Tampa, Fla. 33630-3300.

Figure 4B:
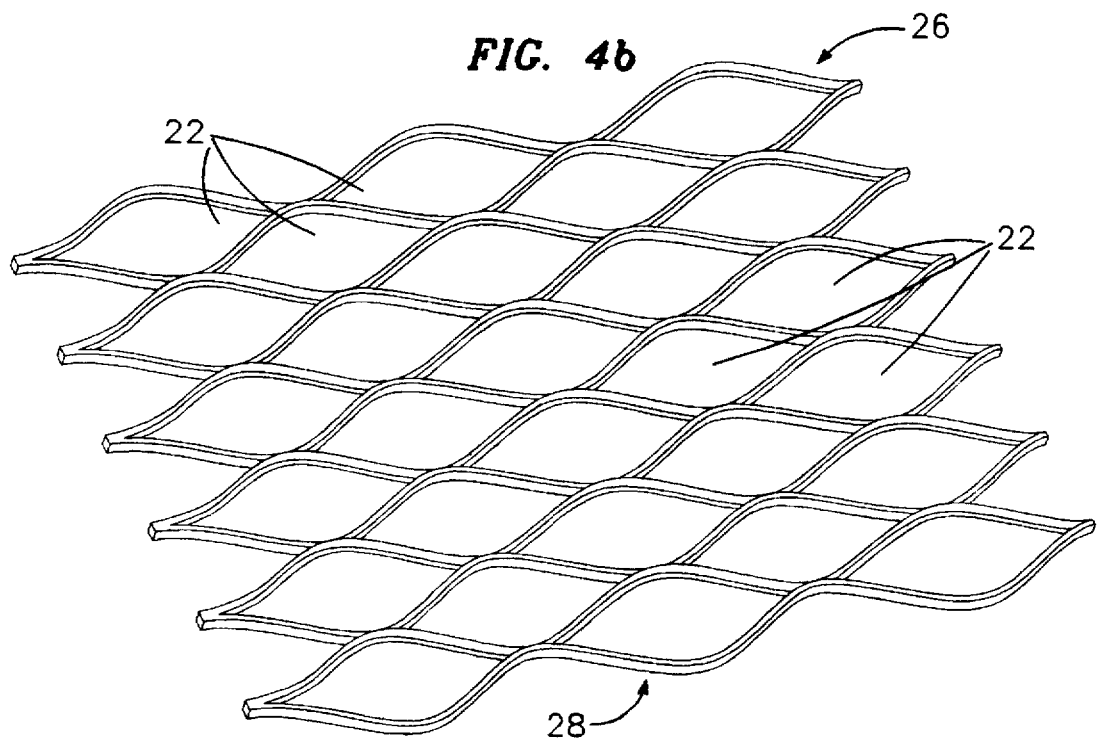
Figure 4C:
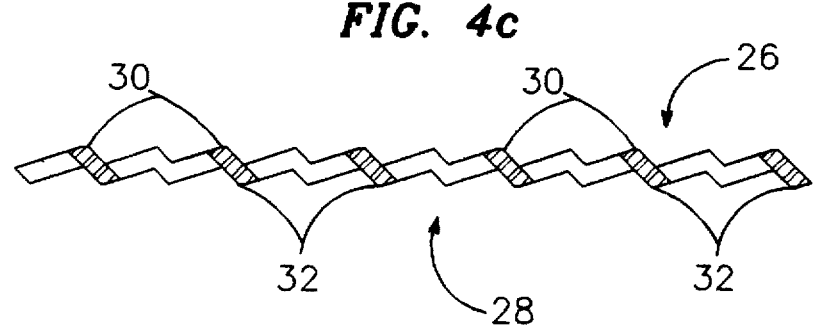
FIG. 4c is a side cross-sectional view of the metal reinforcing member of FIGS. 4a and 4b taken along line 4c—4c showing angled protrusions on a first side of the metal reinforcing member and angled protrusions on a second side of the metal reinforcing member.

As shown in FIG. 4b, the metal reinforcing member 16 has a first side 26 and a second side 28. As shown in FIG. 4c, the first side 26 of the metal reinforcing member 16 has protrusions 30. As shown, preferably the protrusions 30 on the first side 26 of the metal reinforcing member 16 are angled at about forty-five degrees. Likewise, the second side 28 of the metal reinforcing member 16 has protrusions 32. As shown, preferably the protrusions 32 on the second side 28 of the metal reinforcing member 16 are also angled at about forty-five degrees.

As shown in FIG. 2, the protrusions 30 on the first side 26 of the metal reinforcing member 16 are pressed into the first plastic member 12, and the first plastic member 12 is bonded to the protrusions 30. Likewise, the protrusions 32 on the second side 28 of the metal reinforcing member 16 are pressed into the second plastic member 14, and the second plastic member 14 is bonded to the protrusions 32. Because the first plastic member 12 is bonded to the protrusions 30 on the first side 26 of the metal reinforcing member 16, and the second plastic member 14 is bonded to the protrusions 32 on the second side 28 of the metal reinforcing member 16, it is possible to provide that the first plastic member 12, the second plastic member 14 and the metal reinforcing member 16 have non-identical tensile strengths.

By providing the first plastic member 12 and the second plastic member 14 bonded together through apertures 22 in the metal reinforcing member 16 comprised of expanded metal 24, and by providing the first plastic member 12 bonded to angled protrusions 30 on the first side 26 of the metal reinforcing member 16, and the second plastic member 14 bonded to angled protrusions 32 on the second side 28 of the metal reinforcing member 16, the metal reinforced plastic article 10 is endowed with the overall strength of metal and has the added benefit of being lighter than had the metal reinforced plastic article 10 been entirely comprised of metal. By providing that the protrusions 30 on the first side 26 of the metal reinforcing member 16 are angled at forty-five degrees, and that the protrusions 32 on the second side 28 of the metal reinforcing member 16 are angled at forty-five degrees, the protrusions 30 and 32 act like an undercut when pressed into the first plastic member 12 and the second plastic member 14, respectively. Finally, the difference in thicknesses of the first plastic member 12 and the second plastic article 14 provides for a bridging effect when a compression load is applied to the metal reinforced plastic article 10.

Figure 5:
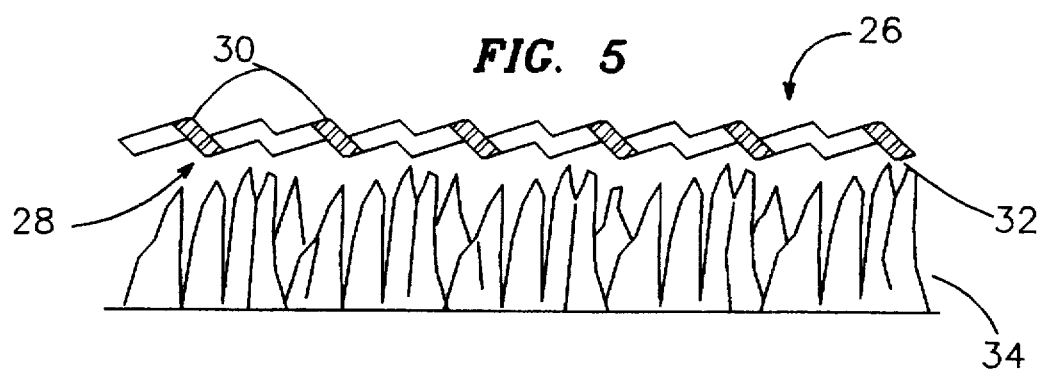
FIG. 5 is an elevational view of the metal reinforcing member of FIG. 4c being heated by heating means.

To form the metal reinforced plastic article 10 as shown in FIGS. 1 and 2, the following method may be used. First, the metal reinforcing member 16 as shown in FIGS. 4a—c is provided, and is heated as shown in FIG. 5. As shown, preferably heating means 34 are used to heat the metal reinforcing member 16. One skilled in the art would realize many different means to heat the metal reinforcing member 16, and would realize that these methods include, but are not limited to, the use of infrared technology, induction energy, a convection oven, or a microwave oven. Preferably, the temperature of the metal reinforcing member 16 is increased to a temperature sufficient to melt into both the first plastic member 12 and the second plastic member 14 to facilitate the following described steps of the present method. Generally, the metal reinforcing member 16 is heated to a temperature between 450 and 650 degrees Fahrenheit, or 100 degrees above the melting point of the material comprising the first plastic member 12 or the second plastic member 14, whichever is lesser. However, the upper portion of this temperature range is used when either the first plastic member 12 or the second plastic member 14 is comprised of ethylene. Nevertheless, lower temperatures may be used resulting in the bonding together of the first plastic member 12 and the second plastic member 14, as described below, taking slightly longer than when the metal reinforcing member 16 is heated to a higher temperature.

Figure 6:
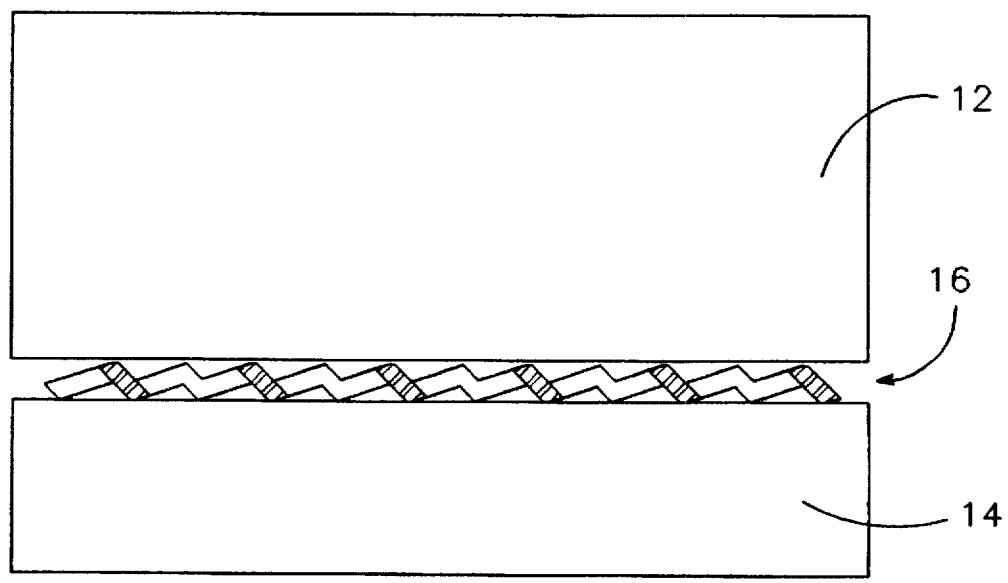
FIG. 6 is an elevational view of the metal reinforcing member of FIG. 4a—c placed between the first plastic member and the second plastic member of FIG. 3.

After the metal reinforcing member 16 is heated as shown in FIG. 5, the metal reinforcing member 16 is placed between the first plastic member 12 and the second plastic member 14 as shown in FIG. 6. Then, the metal reinforcing member 16, the first plastic member 12 and the second plastic member 14 are placed in a compressing apparatus 36 as shown in FIG. 7. Preferably, the compressing apparatus 36 has a first plate 37, a second plate 39, and compressing means 41. After the metal reinforcing member 16, the first plastic member 12 and the second plastic member 14 are placed in the compressing apparatus 36, the compressing apparatus 36 is operated as shown in FIG. 8 so that the compressing means 41 causes the first plate 37 to move toward the second plate 39. As a result, the compressing apparatus 36 presses the first plastic member 12 and the second plastic member 14 together resulting in the first plastic member 12 and the second plastic member 14 bonding together through the apertures in the metal reinforcing member 16 as a result of the metal reinforcing member 16 having been heated to a sufficiently high temperature beforehand as shown in FIG. 5. As shown in FIG. 8, the pressing of the first plastic member 12 and the second plastic member 14 together also results in the protrusions 30 on the first side 26 of the metal reinforcing member 16 pressing into the first plastic member 12, and the first plastic member 12 bonding to the protrusions 30. Likewise, the pressing of the first plastic member 12 and the second plastic member 14 together also results in the protrusions 32 on the second side 28 of the metal reinforcing member 16 pressing into the second plastic member 14, and the second plastic member 14 bonding to the protrusions 32.

Finally, the first plastic member 12, the second plastic member 14 and the metal reinforcing member 16 which then form a resulting metal reinforced plastic article 10 can be removed from the compressing apparatus 36. After the metal reinforced plastic article 10 is removed from the compressing apparatus 36, the metal reinforced plastic article 10 looks as shown in FIGS. 1 and 2.

While the compressing apparatus 36 and the operation thereof is depicted and described generally herein to illustrate the pressing together of the first plastic member 12 and the second plastic member 14, one skilled in the art would recognize alternative methods and apparatuses to use to press the first plastic member 12 and the second plastic member 14 together.

The present invention provides a metal reinforced plastic article having properties which make the metal reinforced article ideal for many different applications. For example, the metal reinforced plastic article of the present invention is ideal when used as a cargo container floor. This is because the metal reinforced plastic article of the present invention provides a relatively lightweight surface which can provide a long life of sustaining heavy loads and which is not susceptible to rust and corrosion. Additionally, an economical method of providing a superior metal reinforced plastic article is provided by the present invention.

The foregoing description and drawings merely explain and illustrate the invention. The invention is not limited thereto, except insofar as the claims are so limited, as those skilled in the art who have a disclosure before them will be able to make modifications and variations therein without departing from the scope of the invention. For example, it is anticipated to be within the scope of the invention that some other metal reinforcing member can be utilized instead of expanded metal, that the plastic members may be comprised of any plastic material, that the first and second plastic members may be of the same thickness, and that there may be provided more than two plastic members and one metal reinforcing member.

What is claimed is:

1. A method of forming a metal reinforced plastic article comprising:

(a) providing a first plastic member;

(b) providing a second plastic member;

(c) providing a metal reinforcing member having at least one aperture;

(d) heating said metal reinforcing member;

(e) placing said heated metal reinforcing member between said first plastic member and said second plastic member; and (f) pressing said first plastic member and said second plastic member together, said pressing resulting in said first plastic member and said second plastic member bonding together through said aperture in said metal reinforcing member, and said pressing resulting in said metal reinforcing member becoming encapsulated between said first plastic member and said second plastic member.

2. The method according to claim 1, wherein said metal reinforcing member has a first side and a second side, wherein said metal reinforcing member further comprises at least one protrusion on said first side of said metal reinforcing member and at least one protrusion on said second side of said metal reinforcing member, and wherein said step of pressing said first plastic member and said second plastic member together results in said protrusion on said first side of said metal reinforcing member pressing into said first plastic member and said protrusion on said second side of said metal reinforcing member pressing into said second plastic member.

3. The method according to claim 2, wherein said step of pressing said first plastic member and said second plastic member together results in said first plastic member bonding to said protrusion on said first side of said metal reinforcing member and said second plastic member bonding to said protrusion on said second side of said metal reinforcing member.

4. The method according to claim 1, wherein said first plastic member comprises polyethylene.

5. The method according to claim 1, wherein said first plastic member comprises polyethylene, and wherein said second plastic member comprises ethylene.

6. The method according to claim 1, wherein said first plastic member is thicker than said second plastic member.

7. The method according to claim 1, wherein said metal reinforcing member comprises expanded metal.

8. The method according to claim 2, wherein said protrusion on said first side of said metal reinforcing member is angled at about forty-five degrees, and wherein said protrusion on said second side of said metal reinforcing member is angled at about forty-five degrees.

9. The method according to claim 1, wherein said step of pressing said first plastic member and said second plastic member together comprises:
   a) providing a compressing apparatus comprising a first plate and a second plate;
   b) placing said first plastic member, said heated metal reinforcing member, and said second plastic member between said first plate and said second plate of said compressing apparatus; and
   c) moving said first plate of said compressing apparatus toward said second plate of said compressing apparatus.

10. The method according to claim 1, wherein said metal reinforcing member is heated before said first plastic member and said second plastic member are pressed together.

11. The method according to claim 1, wherein said metal reinforcing member is heated before said metal reinforcing member is placed between said first plastic member and said second plastic member.

12. The method according to claim 1, wherein said first plastic member is rigid, and wherein said second plastic member is rigid.

13. A method of forming a metal reinforced plastic article comprising:
   (a) providing a first plastic member;
   (b) providing a second plastic member;
   (c) providing a metal reinforcing member having at least one aperture;
   (d) heating said metal reinforcing member;
   (e) placing said heated metal reinforcing member between said first plastic member and said second plastic member; and
   (f) pressing said first plastic member and said second plastic member together, said pressing resulting in said first plastic member and said second plastic member bonding together through said aperture in said metal reinforcing member.

14. The method according to claim 13, wherein said metal reinforcing member has a first side and a second side, wherein said metal reinforcing member further comprises at least one protrusion on said first side of said metal reinforcing member and at least one protrusion on said second side of said metal reinforcing member, and wherein said step of pressing said first plastic member and said second plastic member together results in said protrusion on said first side of said metal reinforcing member pressing into said first plastic member and said protrusion on said second side of said metal reinforcing member pressing into said second plastic member.

15. The method according to claim 14, wherein said step of pressing said first plastic member and said second plastic member together results in said first plastic member bonding to said protrusion on said first side of said metal reinforcing member and said second plastic member bonding to said protrusion on said second side of said metal reinforcing member.

16. The method according to claim 13, wherein said first plastic member comprises polyethylene.

17. The method according to claim 13, wherein said first plastic member comprises ethylene, and wherein said second plastic member comprises polyethylene.

18. The method according to claim 13, wherein said first plastic member is thicker than said second plastic member.

19. The method according to claim 13, wherein said metal reinforcing member comprises expanded metal.

20. The method according to claim 14, wherein said protrusion on said first side of said metal reinforcing member is angled at about forty-five degrees, and wherein said protrusion on said second side of said metal reinforcing member is angled at about forty-five degrees.

21. The method according to claim 13, wherein said step of pressing said first plastic member and said second plastic member together comprises:
   a) providing a compressing apparatus comprising a first plate and a second plate;
   b) placing said first plastic member, said heated metal reinforcing member, and said second plastic member between said first plate and said second plate of said compressing apparatus; and
   c) moving said first plate of said compressing apparatus toward said second plate of said compressing apparatus.

22. The method according to claim 13, wherein said metal reinforcing member is heated before said metal reinforcing member is placed between said first plastic member and said second plastic member.

23. The method according to claim 13, wherein said pressing together of said first plastic member and said second plastic member results in said metal reinforcing member becoming encapsulated between said first plastic member and said second plastic member.

24. The method according to claim 13, wherein said first plastic member is rigid, and wherein said second plastic member is rigid.

25. A method of forming a metal reinforced plastic article comprising:
   (a) providing a first rigid plastic member;
   (b) providing a second rigid plastic member;
   (c) providing a metal reinforcing member having at least one aperture;
   (d) heating said metal reinforcing member;
   (e) placing said heated metal reinforcing member between said first plastic member and said second plastic member; and
   (f) pressing said first plastic member and said second plastic member together, said pressing resulting in said first plastic member and said second plastic member bonding together through said aperture in said metal reinforcing member, and said pressing resulting in said metal reinforcing member becoming encapsulated between said first plastic member and said second plastic member.

* * * * *